(12) United States Patent
Lim

(10) Patent No.: US 12,490,530 B2
(45) Date of Patent: Dec. 2, 2025

(54) PIXEL CIRCUIT AND IMAGE SENSOR

(71) Applicant: PixArt Imaging Inc., Hsin-Chu (TW)

(72) Inventor: Wooi Kip Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 137 days.

(21) Appl. No.: 18/111,905

(22) Filed: Feb. 21, 2023

(65) Prior Publication Data

US 2024/0284070 A1    Aug. 22, 2024

(51) Int. Cl.
*H10F 39/00* (2025.01)
*H04N 25/77* (2023.01)
*H04N 25/771* (2023.01)
*H04N 25/78* (2023.01)

(52) U.S. Cl.
CPC ........... *H10F 39/803* (2025.01); *H04N 25/77* (2023.01); *H04N 25/771* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 11,622,176 B1* | 4/2023 | Lim | H04N 25/771 348/308 |
| 2010/0252717 A1* | 10/2010 | Dupont | H03F 3/08 250/214 A |
| 2012/0033118 A1* | 2/2012 | Lee | H04N 25/77 348/308 |
| 2016/0212362 A1* | 7/2016 | Pang | H04N 25/671 |
| 2017/0070688 A1* | 3/2017 | Pang | H04N 25/53 |
| 2017/0142352 A1* | 5/2017 | Pang | H04N 25/58 |
| 2025/0113114 A1* | 4/2025 | Okada | H04N 25/75 |

* cited by examiner

*Primary Examiner* — Twyler L Haskins
*Assistant Examiner* — Wesley J Chiu
(74) *Attorney, Agent, or Firm* — Winston Hsu

(57) ABSTRACT

A pixel circuit, comprising: a light sensing circuit, configured to operate corresponding to a light intensity of light received by the light sensing circuit; a first capacitor; a first discharging circuit, coupled to the light sensing circuit and the first capacitor, configured to discharge the first capacitor corresponding to an operation of the light sensing circuit; a first charging circuit, coupled to the first capacitor, configured to charge the first capacitor corresponding to the operation of the light sensing circuit; a second capacitor; a second discharging circuit, coupled to the light sensing circuit and the second capacitor, configured to discharge the second capacitor corresponding to the operation of the light sensing circuit; and a second charging circuit, coupled to the second capacitor, configured to charge the second capacitor corresponding to the operation of the light sensing circuit. An image sensor applying the pixel circuit is also disclosed.

8 Claims, 8 Drawing Sheets

PIXEL CIRCUIT AND IMAGE SENSOR

BACKGROUND OF THE INVENTION

1. Field of the Invention

The present invention relates to a pixel circuit and an image sensor, and particularly relates to a pixel circuit and an image sensor which can increase a sensor frame rate.

2. Description of the Prior Art

An image sensor comprises a plurality of pixel circuits for sensing an image to generate light sensing data. A convention pixel circuit may comprise only one light sensing data storing circuit for storing light sensing data. Under such configuration, the pixel circuits could not start to sense a next image until all light sensing data of a current image is read out by a reading circuit. Therefore, a sensor frame rate of the image sensor is limited.

SUMMARY OF THE INVENTION

One objective of the present invention is to provide a pixel circuit which can increase a sensor frame rate.

Another objective of the present invention is to provide a pixel circuit which can increase a sensor frame rate.

One embodiment of the present invention discloses a pixel circuit, comprising: a light sensing circuit, configured to operate corresponding to a light intensity of light received by the light sensing circuit; a first capacitor; a first discharging circuit, coupled to the light sensing circuit and the first capacitor, configured to discharge the first capacitor corresponding to an operation of the light sensing circuit; a first charging circuit, coupled to the first capacitor, configured to charge the first capacitor corresponding to the operation of the light sensing circuit; a second capacitor; a second discharging circuit, coupled to the light sensing circuit and the second capacitor, configured to discharge the second capacitor corresponding to the operation of the light sensing circuit; and a second charging circuit, coupled to the second capacitor, configured to charge the second capacitor corresponding to the operation of the light sensing circuit.

Another embodiment of the present invention discloses an image sensor, comprising a plurality of pixel circuits. Each of the pixel circuit comprises: a light sensing circuit, configured to operate corresponding to a light intensity of light received by the light sensing circuit; a first capacitor; a first discharging circuit, coupled to the light sensing circuit and the first capacitor, configured to discharge the first capacitor corresponding to an operation of the light sensing circuit; a first charging circuit, coupled to the first capacitor, configured to charge the first capacitor corresponding to the operation of the light sensing circuit; a second capacitor; a second discharging circuit, coupled to the light sensing circuit and the second capacitor, configured to discharge the second capacitor corresponding to the operation of the light sensing circuit; and a second charging circuit, coupled to the second capacitor, configured to charge the second capacitor corresponding to the operation of the light sensing circuit.

Still another embodiment of the present invention discloses an image sensor comprising a plurality of pixel circuits. Each of the pixel circuit comprising: a light sensing circuit, configured to provide light sensing data corresponding to a light intensity of light received by the light sensing circuit; a first light sensing data storing circuit, configured to store the light sensing data of a first image; and a second light sensing data storing circuit, configured to store the light sensing data of a second image.

In view of above-mentioned embodiments, the sensor frame rate of the image sensor can be increased since the sensing of different images can be overlapped.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different components, and do not mean the sequence of the components. For example, a first device and a second device only mean these devices can have the same structure but are different devices.

Figure 1:
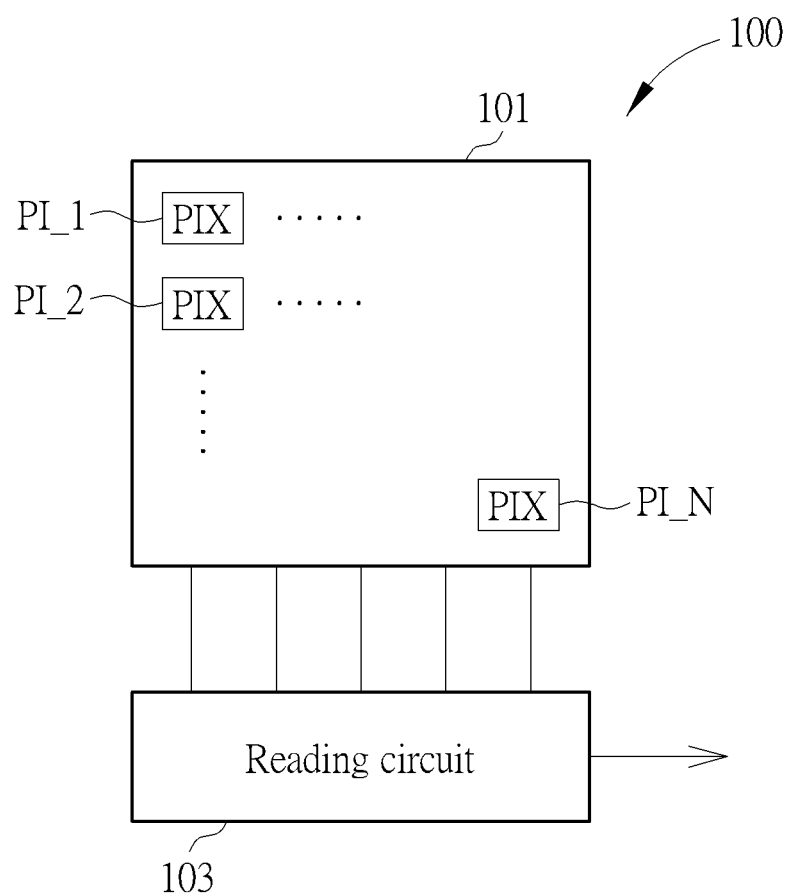
FIG. 1 is a block diagram illustrating an image sensor according to one embodiment of the present invention.

FIG. 1 is a block diagram illustrating an image sensor 100 according to one embodiment of the present invention. As illustrated in FIG. 1, the image sensor 100 comprises a pixel array 101 which comprises a plurality of pixel circuits (only three pixel circuits PI_1, PI_2, PI_n are symbolized), and a reading circuit 103. The pixel circuits PI_1, PI_2, PI_N are configured to sense light to generate light sensing data. In other words, the pixel circuits PI_1, PI_2, PI_N can be exposed to generate light sensing data of an image. The reading circuit 103 is configured to read the light sensing data from the pixel circuits PI_1, PI_2. An image can be generated if all pixel circuits in the pixel array 101 are exposed one time.

Figure 2:
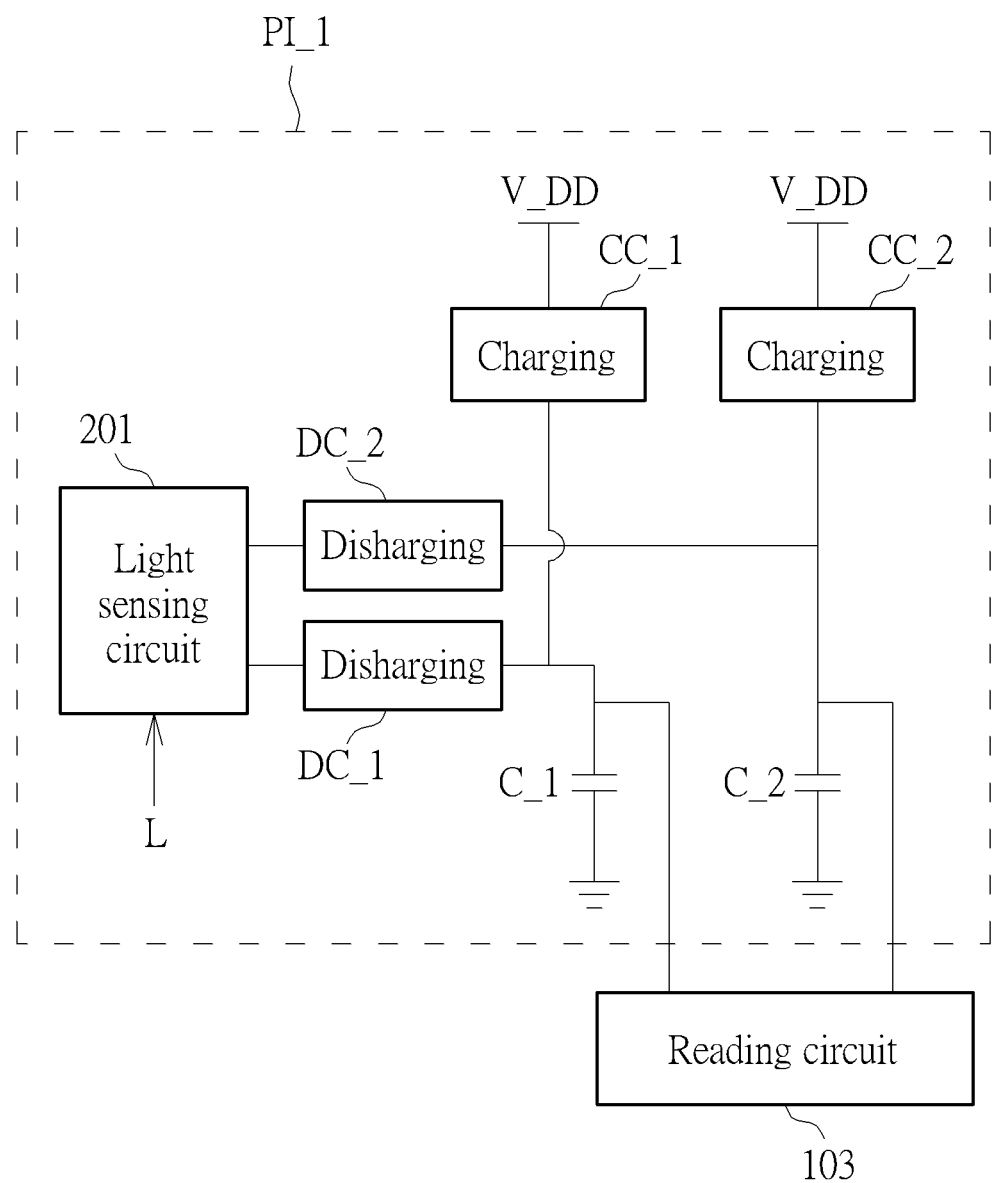
FIG. 2 is a block diagram illustrating a pixel circuit according to one embodiment of the present invention.

FIG. 2 is a block diagram illustrating a pixel circuit according to one embodiment of the present invention. Please note, in following embodiments, the pixel circuit PI_1 is taken as an example for explaining. However, other pixel circuits can have the same structures of the pixel circuit PI_1. As illustrated in FIG. 2, the pixel circuit PI_1 comprises a light sensing circuit 201, a first capacitor C_1, a second capacitor C_2, a first charging circuit CC_1, a second charging circuit CC_2, a first discharging circuit DC_1, and a second discharging circuit DC_2.

The light sensing circuit 201 is configured to operate corresponding to a light intensity of light L received by the light sensing circuit 201. The first discharging circuit DC_1 is coupled to the light sensing circuit 201 and the first capacitor C_1, and is configured to discharge the first capacitor C_1 corresponding to an operation of the light sensing circuit 201. The first charging circuit CC_1 is coupled to the first capacitor and is configured to charge the first capacitor C_1 corresponding to the operation of the light sensing circuit 201. The second discharging circuit DC_2 is coupled to the light sensing circuit 201 and the second capacitor C_2, and is configured to discharge the second capacitor C_2 corresponding to the operation of the light sensing circuit 201. The second charging circuit CC_2 is coupled to the second capacitor C_2, and is configured to charge the second capacitor C_2 corresponding to the operation of the light sensing circuit 201.

Figure 3:
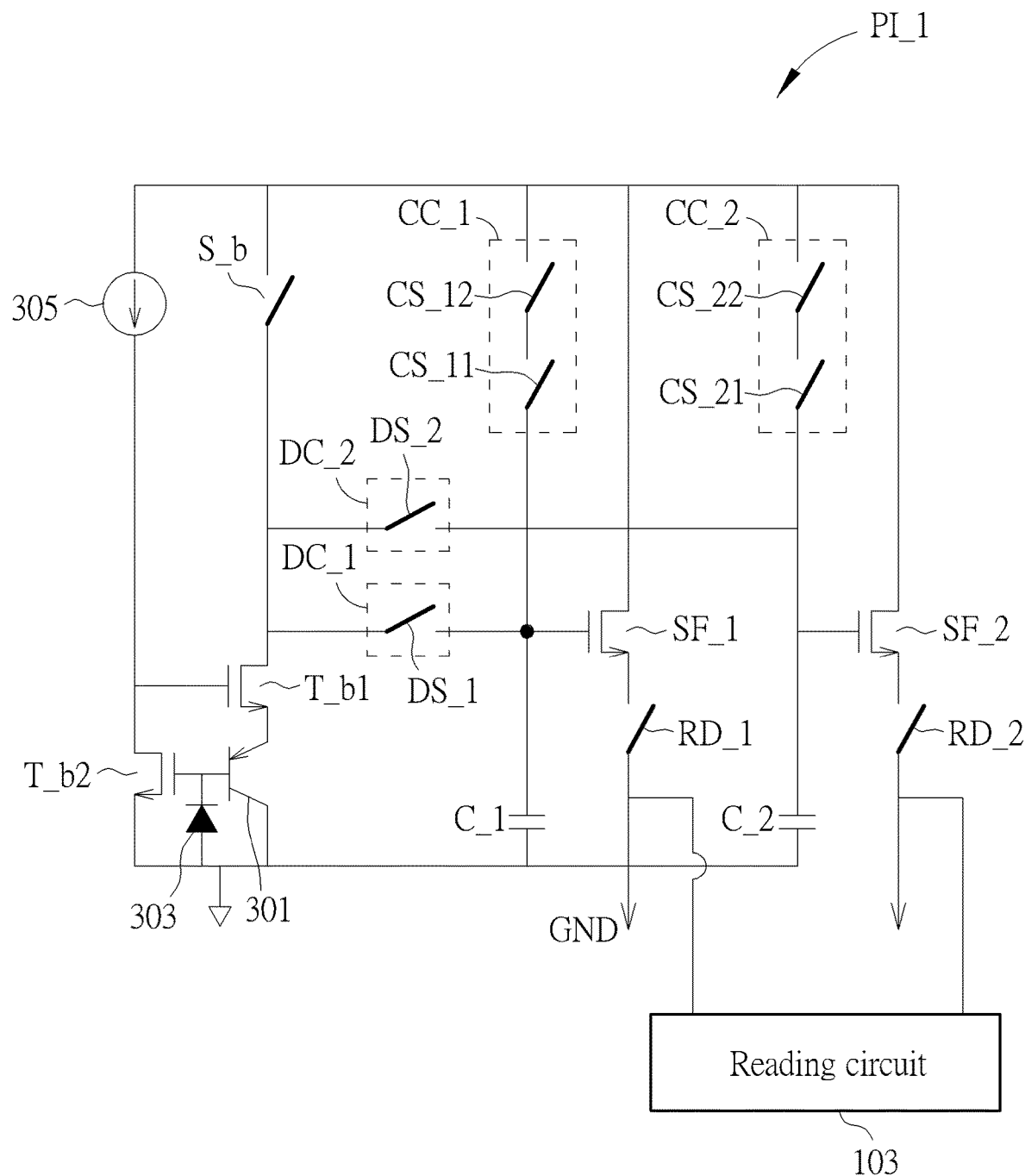
FIG. 3 is a detail circuit diagram of the pixel circuit illustrated in FIG. 2, according to one embodiment of the present invention.

FIG. 3 is a detail circuit diagram of the pixel circuit illustrated in FIG. 2, according to one embodiment of the present invention. Please note, FIG. 3 is only an example for explaining, other circuits which can perform the same function should also fall in the scope of the present invention. In the embodiment of FIG. 3, the first discharging circuit DC_1 and the second discharging circuit DC_2 respectively comprises a discharging switch DS_1 and a discharging switch DS_2. Also, the first charging circuit CC_1 and the second charging circuit CC_2 respectively comprises charging switches CS_11, CS_12 and charging switches CS_21, CS_22.

Besides, in the embodiment of FIG. 3, the pixel circuit PI_1 is a BJT pixel circuit, thus the light sensing circuit 201 comprises a BJT 301 and a light sensing component 303 (a photo diode in this example) coupled to a base of the BJT 301. However, the concepts disclosed by the present invention can be applied to other kinds of pixel circuits besides the BJT pixel circuit. For example, the concept of the present invention can be applied to a pixel circuit with a 3T structure or a 4T structure. The BJT 301 is conducted or non-conducted corresponding to the light intensity of the light (the above-mentioned light L in FIG. 2) received by the light sensing component 303. For example, if the light intensity is larger than a light intensity threshold, the BJT 301 is conducted. In such case, if the discharging switch DS_1 or the discharging switch DS_2 is conducted, the first discharging circuit DC_1 or the second discharging circuit DC_2 correspondingly discharges the first capacitor C_1 or the second capacitor C_2. On the contrary, if the light intensity is smaller than a light intensity threshold, the BJT 301 is non-conducted and the first capacitor C_1, the second capacitor C_2 are not discharged even if the discharging switch DS_1 or the discharging switch DS_2 is conducted.

The first capacitor C_1 comprises a first terminal coupled to the first charging circuit DC_1 and comprises a second terminal coupled to a ground voltage level GND. The second capacitor C_2 comprises a first terminal coupled to the second charging circuit DC_2 and comprises a second terminal coupled to the ground voltage level GND. The pixel circuit PI_1 further comprises a first reading switch RD_1 coupled to the first terminal of the first capacitor C_1, and comprises a second reading switch RD_2 coupled to the first terminal of the second capacitor C_2. If the first reading switch RD_1 is conducted, the reading circuit 103 reads a voltage level of the first capacitor C_1. Similarly, if the second reading switch RD_2 is conducted, the reading circuit 103 reads a voltage level of the second capacitor C_2.

Besides the above-mentioned components of FIG. 3, the pixel circuit PI_1 can further comprise other components. For more detail, the pixel circuit PI_1 in FIG. 3 comprises a current source 305, MOSes T_b1, T_b2, a switch S_b and source followers SF_1, SF_2. These components are configured to provide required voltage or required currents or biasing voltages. For example, the switch S_b, and the MOSes T_b1, T_b2 are configured to provide proper biasing voltages to the BJT 301. Also, the source followers SF_1, SF_2 are configured to operate as buffers. However, these components can be removed or changed corresponding to different design requirements.

Figure 4:
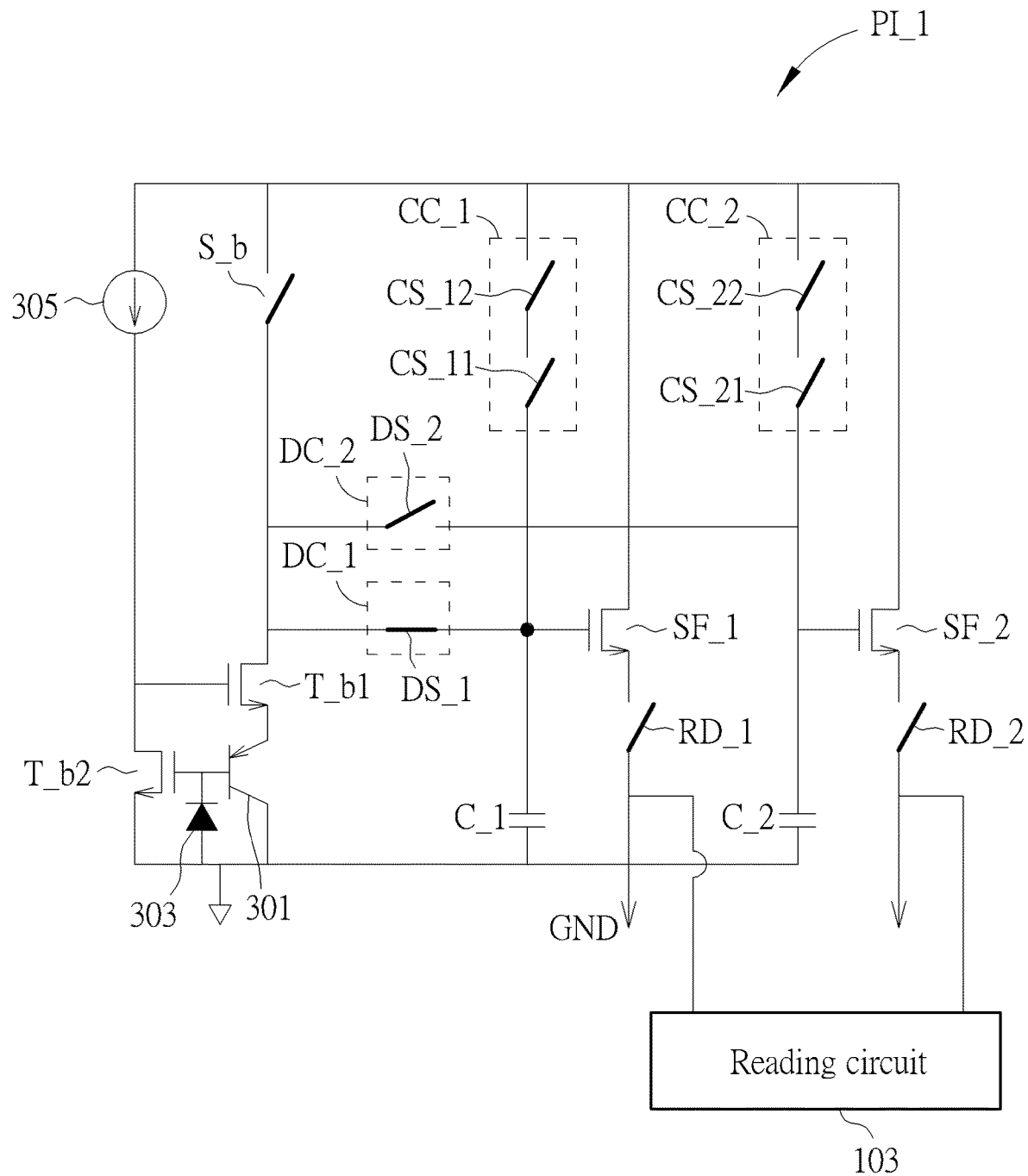
FIG. 4, FIG. 5, and FIG. 6 illustrate the operations of the pixel circuit illustrated in FIG. 3 in different states, according to one embodiment of the present invention.
Figure 5:
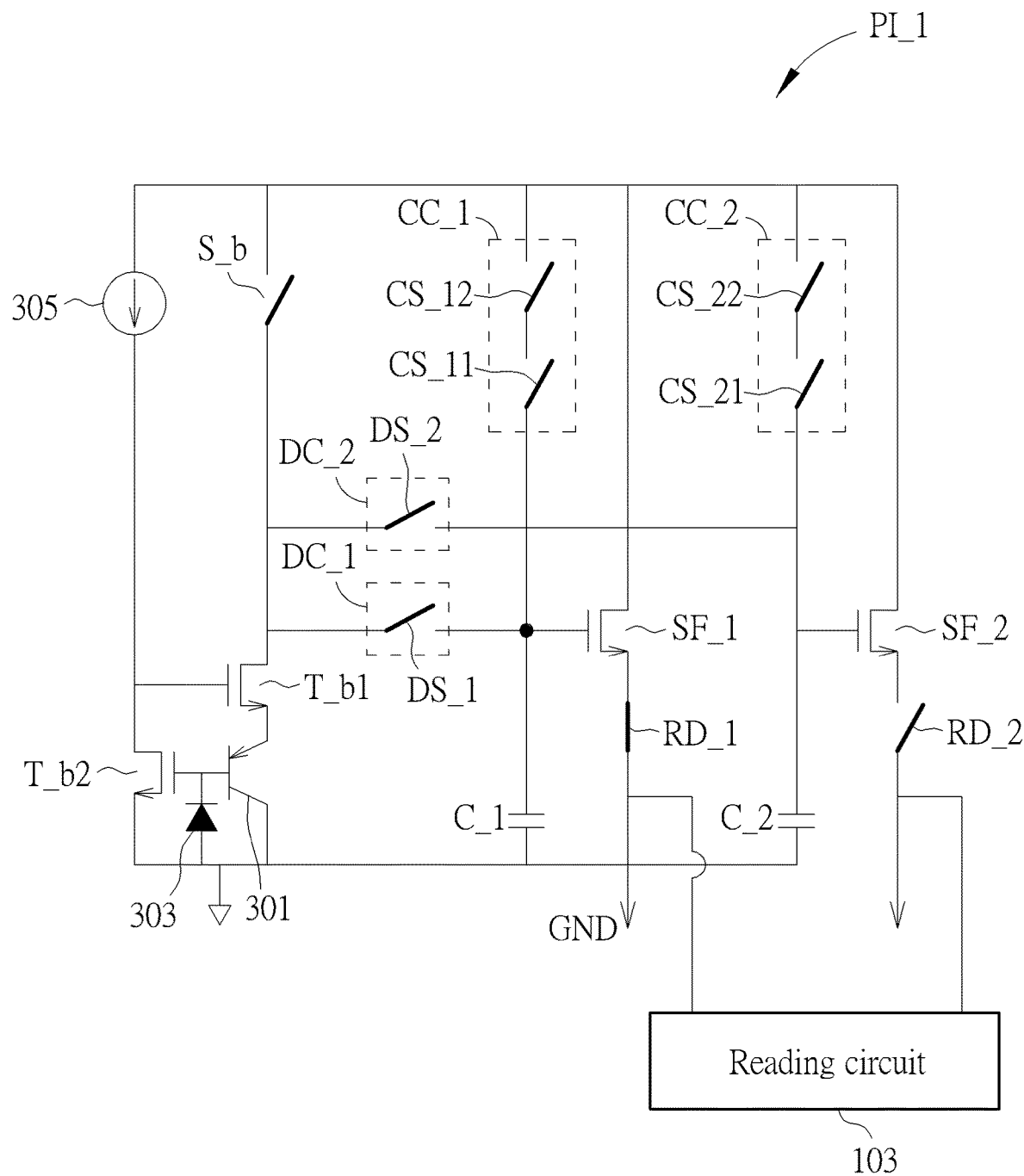
Figure 6:
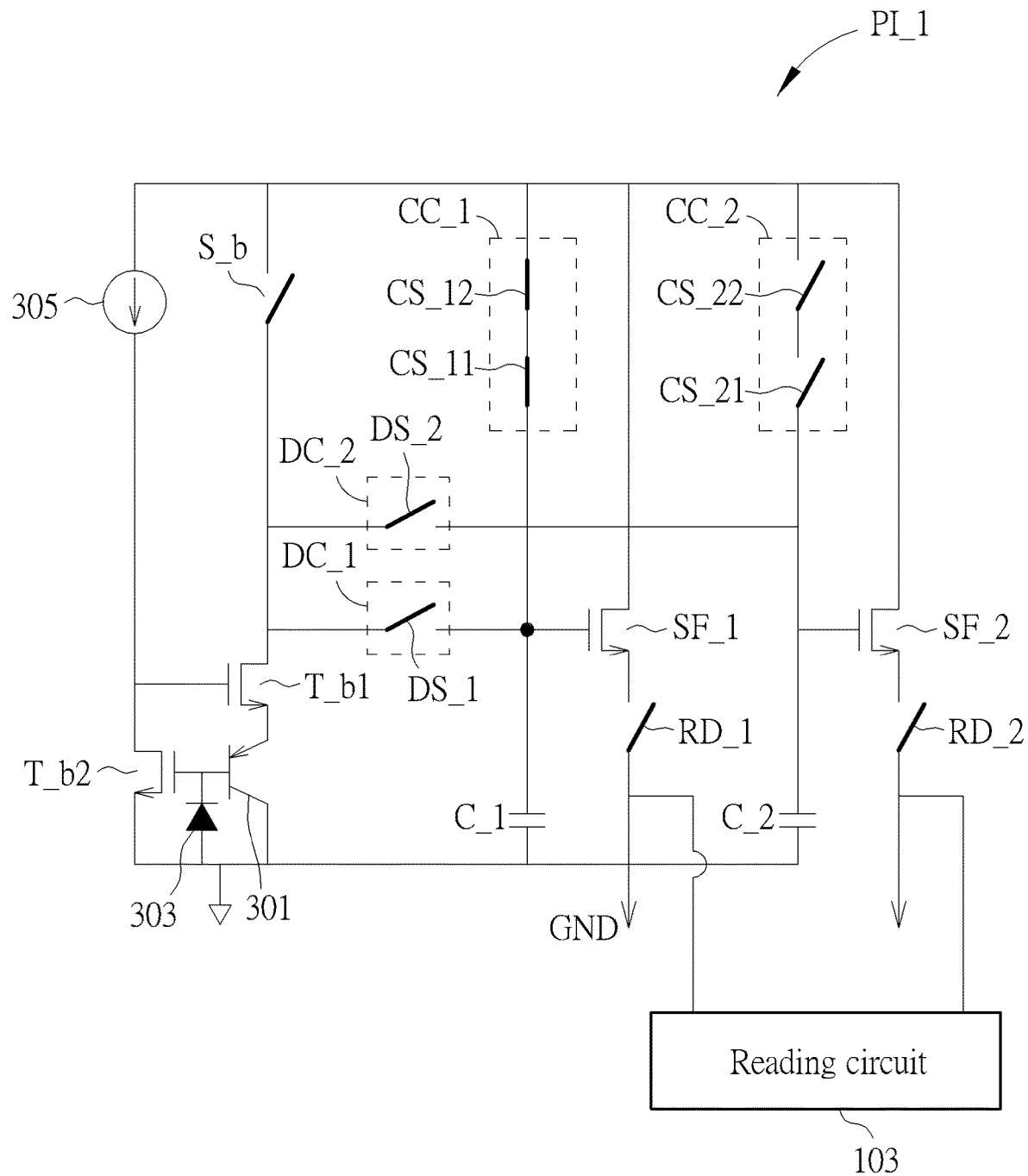
Figure 7:
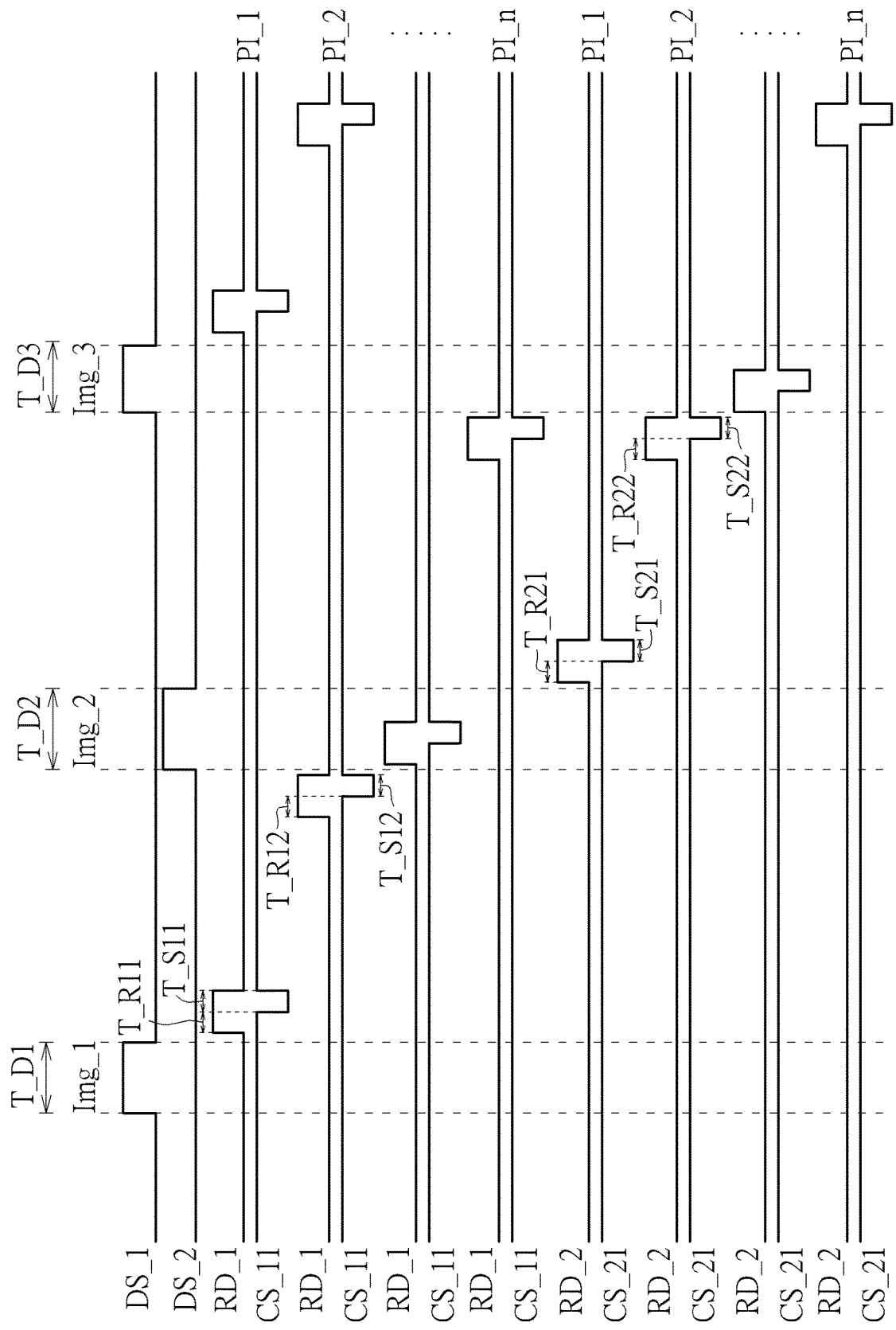
FIG. 7 is a schematic diagram illustrating a wave chart for signals of the pixel circuit illustrated in FIG. 4, FIG. 5, and FIG. 6, according to one embodiment of the present invention.

FIG. 4, FIG. 5, and FIG. 6 illustrated the operations of the pixel circuit illustrated in FIG. 3 in different states, according to different embodiment of the present invention. Specifically, in FIG. 4, the pixel circuit PI_1 is in a discharging state. In FIG. 5, the pixel circuit PI_1 is in a reading state. In FIG. 6, the pixel circuit PI_1 is in a reset state. Further, FIG. 7 is a schematic diagram illustrating a wave chart for signals of the pixel circuit illustrated in FIG. 3, according to one embodiment of the present invention. Please refer to FIG. 7 while referring to FIG. 4, FIG. 5, and FIG. 6, to understand the concepts of the present invention for more clarity. Please note, in FIG. 7, the signals respectively control the components in FIG. 3, FIG. 4, FIG. 5, FIG. 6 which have the same symbols. For example, the signal DS_1 in FIG. 7 means a signal for controlling the discharging switch DS_1 in FIG. 4, FIG. 5, and FIG. 6. For another example, the signal RD_1 in FIG. 7 means a signal for controlling the first reading switch RD_1 in FIG. 4, FIG. 5, and FIG. 6. Additionally, it will be appreciated that the operations of the switch S_b, the MOSes T_b1, T_b2 and the source followers SF_1, SF_2 are not illustrated in FIG. 7, since they are well known by persons skilled in the art.

Furthermore, the signal for controlling the charging switch CS_11 is an inverted signal of the signal for controlling the first reading switch RD_1, but is not illustrated in FIG. 7. Similarly, the signal for controlling the charging switch CS_21 is an inverted signal of the signal for controlling the first reading switch RD_2, but is not illustrated in FIG. 7. In the embodiments of FIG. 3, FIG. 4, FIG. 5, and FIG. 6, all switches besides the charging switches CS_11, CS_12, CS_21 and CS_22 turn on (conducted) when corresponding signals have high logic levels and turn off (non-conducted) when corresponding signals have low logic levels. However, the charging switches CS_11, CS_12, CS_21 and CS_22 turn off when corresponding signals have high logic levels and turn on when corresponding signals have low logic levels.

Please refer to FIG. 7, first, a first image Img_1 is exposed in the sensing time interval T_D1. In other words, all pixel circuits in the pixel array 101 are exposed. In such case, the discharging switch DS_1 in all pixel circuits turn on, as shown in FIG. 4. In such case, if corresponding BJTs 301 turn on due to the received light, corresponding first capacitors C_1 are discharged. On the contrary, if corresponding BJTs turn off due to the received light, corresponding first capacitors C_1 are not-discharged. By this way, the voltage levels (or named the charge amount) of the first capacitors C_1 in all pixel circuits vary corresponding to the light received by the light sensing components 303 in all pixel circuits.

After the first image Img_1 is exposed, voltage levels of the first capacitors C_1 in all pixel circuits are read out in sequential. For example, as shown in FIG. 5, the discharging switch DS_1 turns off and the first reading switch RD_1 turns on, such that the voltage level of the first capacitor C_1 is read by the reading circuit 103 in the reading time interval T_R11 in FIG. 7. After the voltage level of the first capacitor C_1 is read, the first capacitor C_1 is charged by the first charging circuit CC_1 (e.g., reset) in the reset time interval T_S11 in FIG. 7. As shown in FIG. 6, the charging switches CS_11 and CS_12 both turn on in the reset time interval T_S11 in FIG. 7.

Following the same rule, the first capacitors C_1 in all pixel circuits are read and then reset in sequence. For example, as shown in FIG. 7, the first capacitor C_1 in the pixel circuit PIX_2 is read in the reading time interval T_R12 and reset in the reset time interval T_S12, which are after the time interval T_R11 and the reset time interval T_S11. Such operations are repeated until the first capacitors C_1 in the final pixel circuit PI_n in the pixel array 101 is read and reset. Therefore, the operation "sensing an image" comprises the steps of "exposing an image, read voltage levels of capacitors in all pixel circuits, and reset all the capacitors".

In view of above-mentioned operations illustrated in FIG. 4, FIG. 5 and FIG. 6, if only the first capacitor C_1, the first discharging circuit DC_1 and the first charging circuit CC_1 are comprised in the pixel circuit PI_1, the second image Img_2 could not be sensed until first capacitors C_1 in all pixel circuits are read and reset. That is, the second image Img_2 could not be sensed until sensing of the first image Img_1 is completed. Thereby, the sensor frame rate of the image sensor 100 is reduced. However, the pixel circuit provided by the invention further comprises another capacitor, another charging circuit and another discharging circuit, thus the second image can be sensed even only portion of the first capacitor C is are read and reset (i.e., the sensing of the first image Img_1 is not completed yet).

As shown in FIG. 7, a second image Img_2 is exposed in the sensing time interval T_D2, which is before those first capacitors C_1 in all pixel circuits are read and reset in the sensing time interval T_D2. In other words, all pixel circuits in the pixel array 101 are exposed. In such case, the discharging switch DS_2 in all pixel circuits turn on, following the rule illustrated in FIG. 4. If corresponding BJTs turn on due to the received light, corresponding second capacitors C_2 are discharged. On the contrary, if corresponding BJTs turn off due to the received light, corresponding second capacitors C_2 are not-discharged. By this way, the voltage levels of the second capacitors C_2 in all pixel circuits vary corresponding to the light received by the light sensing components 303 in all pixel circuits.

After the second image Img_2 is exposed, voltage levels of the second capacitors C_2 in all pixel circuits are read out in sequential. For example, following the rule shown in FIG. 5, the discharging switch DS_2 turns off and the second reading switch RD_2 turns on, such that the voltage level (or named the charge amount) of the second capacitor C_2 is read by the reading circuit 103 in the reading time interval T_R21 in FIG. 7. After the voltage level of the second capacitor C_2 is read, the second capacitor C_2 is charged by the second charging circuit CC_2 (e.g., reset) in the reset time interval T_S21 in FIG. 7. Following the rule shown in FIG. 6, the charging switches CS_21 and CS_22 both turn on in the reset time interval T_S21 in FIG. 7.

Following the same operations of the first capacitor C_1, the second capacitors C_2 in all pixel circuits are read and then reset in sequence. For example, as shown in FIG. 7, the second capacitor C_2 in the pixel circuit PIX_2 is read in the reading time interval T_R22 and reset in the reset time interval T_S22 in FIG. 7, which are after the read time interval T_R21 and the reset time interval T_S21. Such operations are repeated until the second capacitors C_2 in the final pixel circuit PI_n in the pixel array 101 is read and reset.

Sensing of other images can follow the operations of sensing the above-mentioned first image Img_1 and second image Img_2. For example, as shown in FIG. 7, a third image Img_1 can be sensed even when the sensing of the second image Img_2 is not completed. However, the sensing of the third image Img_3 applies the first capacitor C_1 rather than the second capacitor C_2, since the sensing of the second image Img_2 is still performed but the sensing of the first image Img_1 is completed.

Briefly, in view of the embodiments illustrated in FIG. 4, FIG. 5, FIG. 6, and FIG. 7, two capacitors are used for sensing images in turn, and a next image can be sensed even when the previous image is still sensed. Please note, the pixel circuits can have more than two capacitors, more than two charging circuits and more than two discharging circuits. For example, N capacitors, N charging circuits and N discharging circuits (N is a positive integer larger than 2) can be provided in the pixel circuit. In such case, N capacitors are used for sensing images in turn, and a next image can be sensed even when the previous image is still sensed. By this way, the sensor frame rate of the image sensor can be increased.

Figure 8:
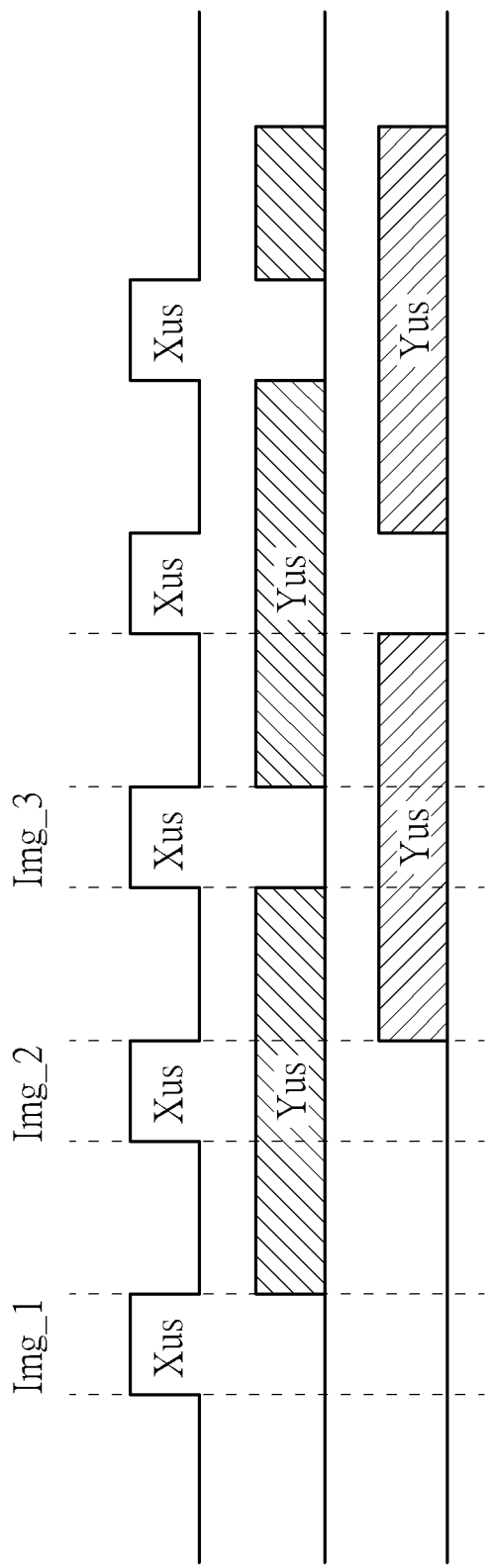
FIG. 8 is a schematic diagram illustrating the operations of sensing images by an image sensor provided by the present invention, according to one embodiment of the present invention.

FIG. 8 is a schematic diagram illustrating the operations of sensing and reading images of an image sensor provided by the present invention, according to one embodiment of the present invention. In the example of FIG. 8, it is supposed that the time for exposing an image is X us (i.e., the first discharging switch DS_1 or the second discharging switch DS_2 turn on), and the time for reading and resetting all capacitors for one image is Y us. Therefore, for a conventional image sensor, the total time for sensing an image is X+Y us, and P*(X+Y) us are needed if P images are sensed. However, for the image sensor provided by the present invention, the total time for sensing P images can be less than P*(X+Y) since the sensing of images can be overlapped. Accordingly, the sensor frame rate of the image sensor can be increased.

Please note, the abovementioned first charging circuit CC_1, the first discharging circuit DC_1 and the first capacitor C_1 can be regarded as a first light sensing data storing circuit, and the abovementioned second charging circuit CC_2, the second discharging circuit DC_2 and the second capacitor C_2 can be regarded as a second light sensing data storing circuit. Therefore, the image sensor provided by the present invention can be summarized as: An image sensor comprising a plurality of pixel circuits. Each of the pixel circuit comprises: a light sensing circuit, configured to provide light sensing data (e.g., electrons or currents) corresponding to a light intensity of light received by the light sensing circuit (e.g., light sensing circuit 201 in FIG. 2); a first light sensing data storing circuit, configured to store the light sensing data of a first image (e.g., the first image Img_1 in FIG. 7); and a second light sensing data storing circuit, configured to store the light sensing data of a second image (e.g., the second image Img_2 in FIG. 7).

In such case, the second light sensing data storing circuit starts to store the light sensing data of the second image before all the light sensing data of the first image are stored by the first light sensing data storing circuit. That is, the second image can be sensed when the sensing of the first image is still performed.

Further, in such embodiment, the abovementioned reading circuit reads the light sensing data from the first light sensing data storing circuit within a time period. The light sensing data of the second image is generated within the time period.

In view of above-mentioned embodiments, the sensor frame rate of the image sensor can be increased since the sensing of different images can be overlapped.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a plurality of pixel circuits, each of the pixel circuit comprising:
   a light sensing circuit, configured to operate corresponding to a light intensity of light received by the light sensing circuit;
   a first capacitor, configured to store charges caused by sensing a first image;
   a first discharging circuit, coupled to the light sensing circuit and the first capacitor, configured to discharge the first capacitor corresponding to an operation of the light sensing circuit, to expose a portion of the first image;
   a first charging circuit, coupled to the first capacitor, configured to charge the first capacitor corresponding to the operation of the light sensing circuit;
   a second capacitor, configured to store charges caused by sensing a second image;
   a second discharging circuit, coupled to the light sensing circuit and the second capacitor, configured to discharge the second capacitor corresponding to the operation of the light sensing circuit, to expose a portion of the second image;
   a second charging circuit, coupled to the second capacitor, configured to charge the second capacitor corresponding to the operation of the light sensing circuit;
   a reading circuit;
   a first reading switch, wherein the reading circuit reads a voltage level of the first capacitor when the first reading switch is conducted, to read the portion of the first image; and
   a second reading switch, wherein the reading circuit reads a voltage level of the second capacitor when the second reading switch is conducted, to read the portion of the second image;
   wherein the second image is started to be exposed during reading all of the first capacitors in the pixel circuits.

2. The image sensor of claim 1,
   wherein the pixel circuit is a BJT pixel circuit, and the light sensing circuit comprises a BJT;
   wherein BJT is conducted or non-conducted corresponding to the light intensity;
   wherein the first discharging circuit discharges the first capacitor and the second discharging discharges the second capacitor when the BJT is conducted;
   wherein the first charging circuit charges the first capacitor after the first discharging circuit discharges the first capacitor, and the second charging circuit charges the second capacitor after the second discharging circuit discharges the second capacitor.

3. The image sensor of claim 2, wherein the second discharging circuit discharges the second capacitor after the first charging circuit charges the first capacitor and before the first discharging circuit discharges the first capacitor for a next time.

4. The image sensor of claim 3,
   wherein the first capacitor comprises a first terminal coupled to the first charging circuit and comprises a second terminal coupled to a ground voltage level;
   wherein the second capacitor comprises a first terminal coupled to the second charging circuit and comprises a second terminal coupled to the ground voltage level;
   wherein the first reading switch is coupled to the first terminal of the first capacitor and the second reading switch is coupled to the first terminal of the second capacitor.

5. The image sensor of claim 4,
   wherein the first reading switch is conducted after the first discharging circuit discharges the first capacitor and before the first charging circuit charges the first capacitor;
   wherein the second reading switch is conducted after the second discharging circuit discharges the second capacitor and before the second charging circuit charges the second capacitor.

6. The image sensor of claim 5, wherein the second discharging circuit discharges the second capacitor after the first reading switch is conducted.

7. The image sensor of claim 2, wherein the light sensing circuit further comprises a light sensing component coupled to a base of the BJT, wherein the light sensing component is configured to receive the light.

8. The image sensor of claim 2, wherein the second discharging circuit discharges the second capacitor before all of the first capacitors are read.

* * * * *